(12) United States Patent
Yu et al.

(10) Patent No.: US 9,128,532 B2
(45) Date of Patent: Sep. 8, 2015

(54) KEYBOARD WITH SCREW NUT

(71) Applicant: HEWLETT-PACKARD DEVELOPMENT COMPANY, L.P., Houston, TX (US)

(72) Inventors: Ming-Jen Yu, Taipei (TW); Cheng-Han Wu, Taipei (TW); Earl W. Moore, Cypress, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 459 days.

(21) Appl. No.: 13/631,222

(22) Filed: Sep. 28, 2012

(65) Prior Publication Data

US 2014/0090966 A1    Apr. 3, 2014

(51) Int. Cl.
*G06F 3/02* (2006.01)
*G06F 1/16* (2006.01)
*H01H 13/705* (2006.01)
*H01H 13/88* (2006.01)

(52) U.S. Cl.
CPC ............ *G06F 3/0202* (2013.01); *G06F 1/1662* (2013.01); *H01H 13/705* (2013.01); *H01H 13/88* (2013.01); *H01H 2221/066* (2013.01); *H01H 2229/032* (2013.01); *Y10T 29/49865* (2015.01); *Y10T 29/49963* (2015.01)

(58) Field of Classification Search
CPC ................ G06F 3/0202; G06F 1/6662; H01H 2229/032; H01H 2223/024; H01H 2223/054; H01H 2223/056
See application file for complete search history.

(56) References Cited

U.S. PATENT DOCUMENTS

| | | | |
|---|---|---|---|
| 2,336,791 A * | 12/1943 | La Barre | 411/259 |
| 5,113,360 A | 5/1992 | Satou | |
| 5,483,418 A | 1/1996 | Hosoi | |
| 6,215,420 B1 * | 4/2001 | Harrison et al. | 341/22 |
| 6,347,042 B1 * | 2/2002 | White | 361/784 |
| 7,710,728 B2 * | 5/2010 | Arisaka et al. | 361/719 |
| 2008/0124189 A1 * | 5/2008 | Hsu et al. | 411/393 |
| 2011/0043985 A1 | 2/2011 | Yang | |
| 2011/0170269 A1 * | 7/2011 | Blossfeld et al. | 361/752 |
| 2012/0154291 A1 * | 6/2012 | Abe | 345/170 |
| 2012/0163893 A1 | 6/2012 | Liu | |

FOREIGN PATENT DOCUMENTS

| | | | |
|---|---|---|---|
| GB | 2374973 A | 10/2002 | |
| JP | 2011196446 A * | 10/2011 | F16B 4/00 |

OTHER PUBLICATIONS

Racmount Keyboard Installation Instructions, Chassis Plans, Download Date: Sep. 28, 2012. <http://www.chassis-plans.com/PDF/220002000A_Rackmount_Keyboard_Installation_Instructions.pdf>.

* cited by examiner

*Primary Examiner* — Daniel J Colilla

(74) *Attorney, Agent, or Firm* — Hewlett-Packard Patent Department

(57) ABSTRACT

A keyboard comprising a keyboard module, a support plate and at least one screw nut attached to the support plate.

18 Claims, 6 Drawing Sheets

Provide keyboard module and support plate having plurality of bosses for attachment to a screw nut
200

Fit a keyboard frame over a keyboard module, wherein the keyboard frame has projections that extend through holes in the keyboard module and support plate to form bosses
210

Select some of the bosses for attachment to screw nut
220

Attach a screw nut to the selected bosses
230

*Fig. 6*

KEYBOARD WITH SCREW NUT

BACKGROUND

A keyboard for a computing device, such as a laptop computer, typically comprises a keyboard module having a plurality of keys and a support plate to which the keyboard module is attached. A screw nut is typically riveted to the back of the support plate to facilitate attachment to a computer frame/base. The location of the screw nut needs to be selected carefully as otherwise it may interfere with circuitry and other components of the computer.

BRIEF DESCRIPTION OF THE DRAWINGS

Examples of the invention will now be described, by way of non-limiting example only, with reference to the accompanying drawings, in which:

FIG. 6 is a flow diagram showing an example method of assembling the keyboard.

DETAILED DESCRIPTION

It would be economically efficient to use the same keyboard with multiple different portable electronic devices. For example the same keyboard size and layout may be used in laptops having 14 or 16 inch monitors, or in different models having the same monitor size but a different specification (processor, graphics chip, memory, hard drive size and type etc). However, each type of portable electronic device (e.g. each laptop model) may have internal components in different positions. If a screw nut of the keyboard contacts, or interferes with, an internal component of a particular portable electronic device, then it cannot be used with that portable electronic device. Accordingly, the present disclosure proposes a manufacturing method in which the location of the screw nut can be chosen from among a plurality of possible locations and a keyboard manufactured according to that method.

Figure 1:
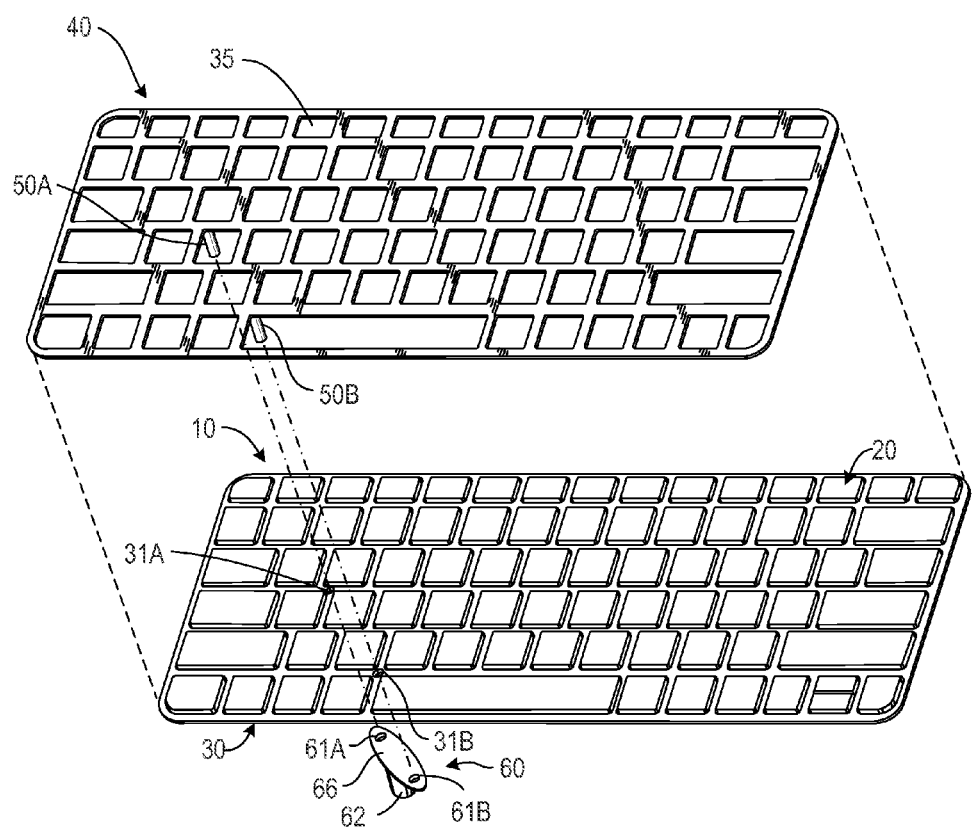
FIG. 1 shows an example of components for assembly into a keyboard.

FIG. 1 shows components for assembly into a keyboard, including a keyboard module 10 and support plate 30, a keyboard frame 40 and a screw nut 60.

The keyboard module 10 comprises a plurality of keys 20. Each key typically has a letter, number or character on top to indicate the symbol it will produce when pressed. Many configurations of keyboard module are possible; in one arrangement a key top snap fits to a supporting structure, a resilient spring to return the key top to initial position after it has been depressed, a switch or sensor that detects when the key is depressed and a circuit board connected to the switch or sensor for initial processing of the signals.

The keyboard module 10 is mounted on a support plate 30. The support plate 30 may comprise the circuit board itself, but more often the circuit board is flexible and attached to a separate support plate to give solidity to the keyboard and facilitate easy mounting of the keyboard. The support plate may be made of metal.

Modern keyboard designs often, but not always, have a separate keyboard frame 40, which may for example be in the form of a lattice which fits over and around the keys. When the lattice is in place, the keys of the keyboard module fit through the gaps 35 of the lattice. This gives an aesthetically pleasing appearance and covers up gaps between keys, thus allowing relatively flat, shallow keys, as is the current trend in fashionable laptops.

FIG. 1 also shows a screw nut 60 comprising a main body 62 having a threaded aperture for receiving a screw and a plate portion 66. The screw nut may be attached to the keyboard support plate. The screw nut enables the keyboard to be screwed into a main body, frame etc of a portable electronic device.

There are various possible methods of attaching the screw nut 60 to the support plate 30, for example: heat bonding, adhesion, securing with a small screw in an aperture of a screw nut support plate etc.

In the illustrated example, the screw nut's support plate 66 has first and second holes 61A, 61B. The keyboard frame 40 has projecting portions 50A and 50B. On assembly of the keyboard these projections 50A, 50B extend through holes 31A and 31B of the keyboard module and support plate and through holes 61A and 61B of the screw nut plate portion 66.

Figure 2A:
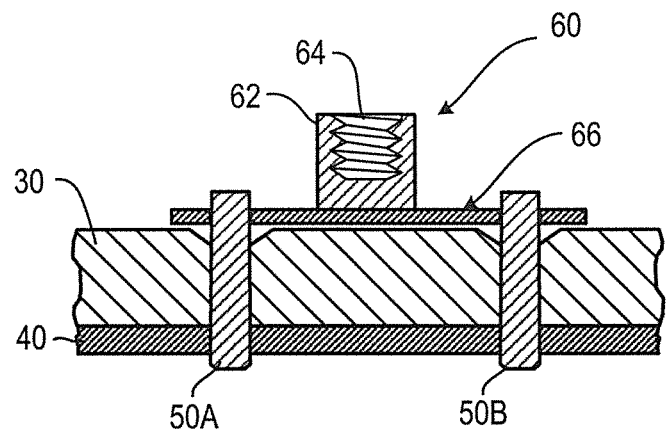
FIG. 2A shows an example of a keyboard frame assembled with a keyboard support plate and screw nut.

By way of example only, one possible method of attaching the screw nut plate to the support plate will now be described with reference to FIGS. 2A and 2B. It should be noted that in FIGS. 2A and 2B the bottom of the support plate 30 is facing upwards (i.e. it is the opposite orientation to FIG. 1 in which the bottom of the support plate faces downwards). FIG. 2A shows a portion of a keyboard frame 40 with a pair of projections 50A, 50B projecting upwards through the keyboard support plate 30. The projections 50A, 50B may be made out of any material and typically will be integral with, and/or made out of the same material as, the keyboard frame 40.

In one example the projections are made from a material suitable for heat bonding (at a temperature which does not damage the keyboard module), for instance plastic. If the projections are designed for heat bonding, then they are known as a 'heat stake pins'.

The support plate has a pair of holes for receiving the projections 50A, 50B and may have recesses 55A, 55B surrounding each hole. The screw nut 60 is typically made of metal and comprises a main body 62 with a threaded aperture 64 and a plate portion 66. The screw nut is mounted on the underside of the support plate 30 (the top of FIG. 2A). The projections 50A, 50B extend through first and second holes of the screw nut's plate portion 66.

Figure 2B:
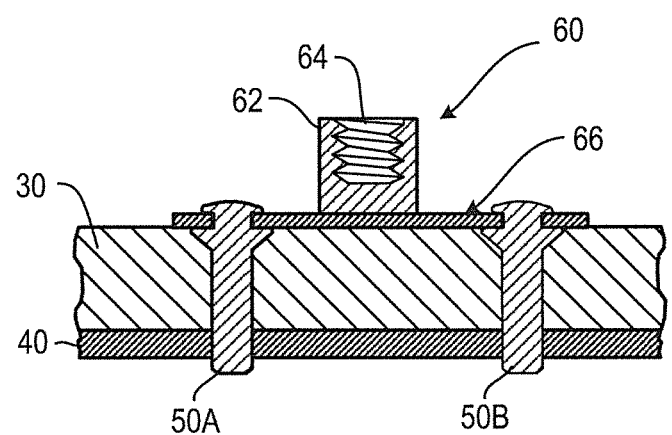
FIG. 2B shows the example of FIG. 2B after heat bonding.

FIG. 2B shows the arrangement after the screw nut 60 has been attached to the support plate 30 by heat bonding. Specifically, in the example of FIG. 2B, the screw nut has been attached to the support plate 30 by heat bonding of first 50A and second 50B heat stake pins to the screw nut's plate portion 66. In the illustrated example, the heat stake pins 50A and 50B have melted and re-solidified to fill the recesses 55A, 55B and cover a portion of the plate 66 surface, affording a degree of mechanical attachment as well. While there are two heat stake pins shown in FIGS. 2A and 2B, in other examples only one, or more than two heat stake pins may be used to attach to the screw nut 60 to the support plate 30.

Once the screw nut is in place, the keyboard may be conveniently attached with a screw to the main body or a frame of a portable computing device (e.g a laptop computer). This helps to secure the keyboard, prevent it from moving around and provides a further impression of stability to the user, especially if the keyboard module and/or support plate are light weight.

Figure 3:
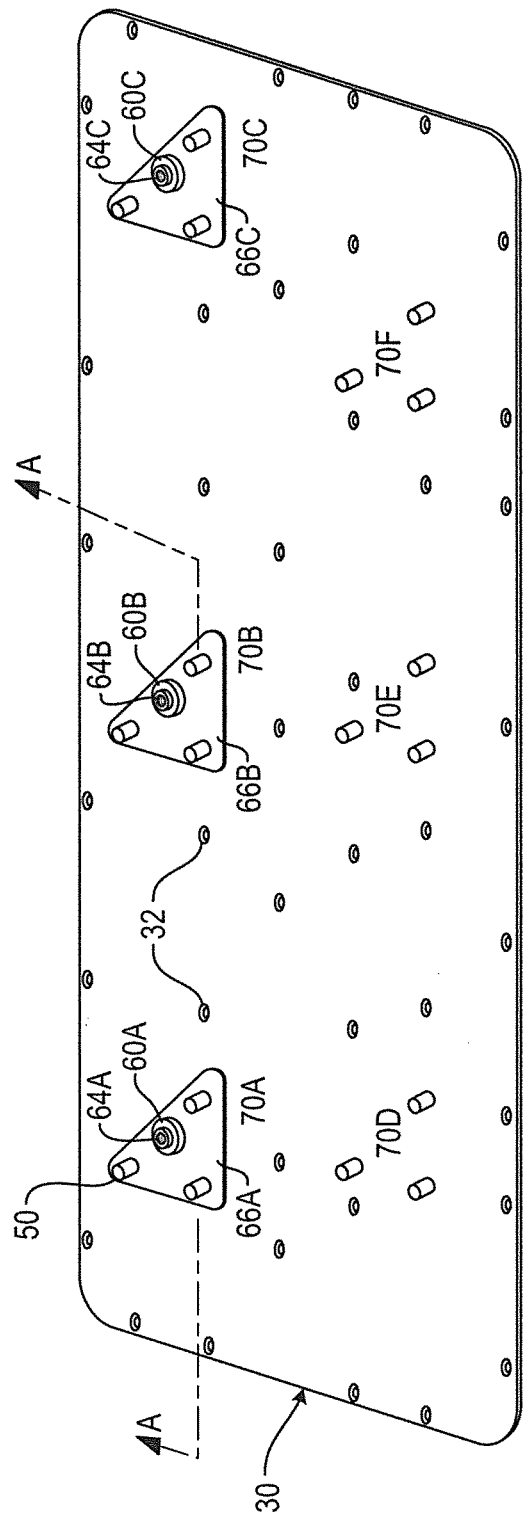
FIG. 3 shows an example of a keyboard support plate with screw nuts attached to certain selected groups of bosses.
Figure 4:
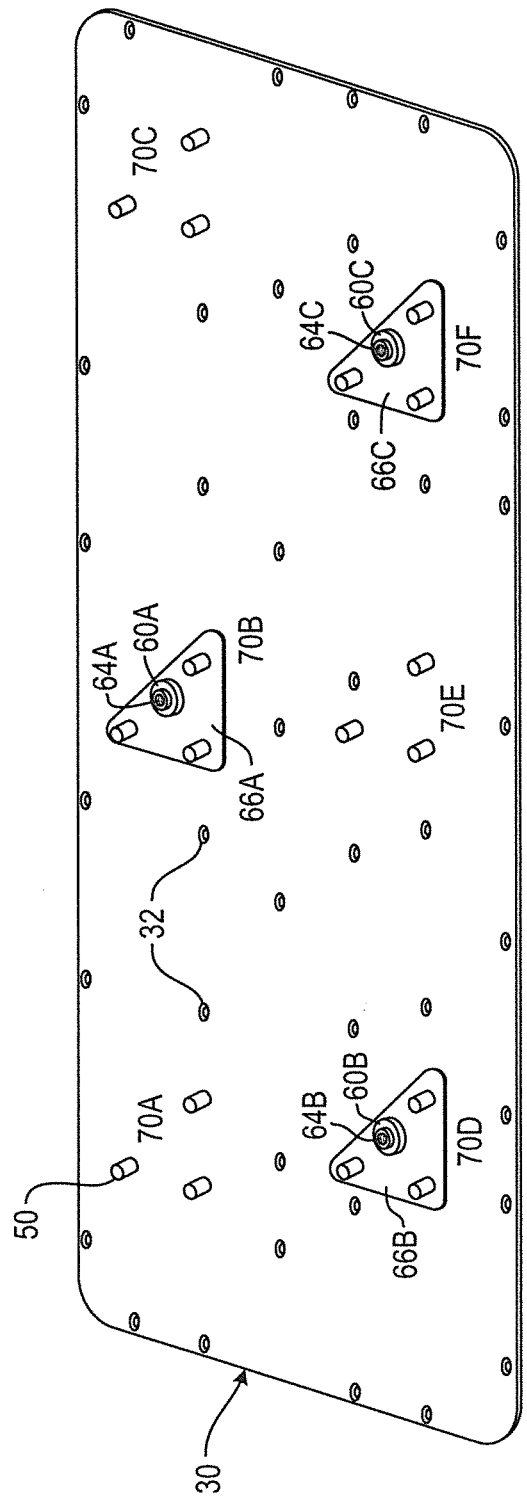
FIG. 4 shows the example FIG. 3, but in which the screw nuts are attached to different groups of bosses.

FIGS. 3 and 4 show examples of the bottom of the keyboard support plate 30. According to the present disclosure the manufacturer (e.g. an Original Equipment Manufacturer or 'OEM') may select the location of the screw nut (or screw nuts) to fit the portable electronic device they are assembling. Thus in the example shown in FIG. 3 the groups of 'bosses' 70A, 70B and 70C are selected to attach a screw nut to. In the example shown in FIG. 4 groups of bosses 70B, 70D and 70F are selected to attach a screw nut. Thus, in summary, there are plural groups of bosses to which a screw nut may be attached. The manufacturer may select one or more groups of bosses to attach a screw nut, based on location, so as to avoid interference between the screw nut and internal components of the electronic device.

According to one example, the bosses are the projections 50 of the keyboard lattice 40, for instance as shown in FIGS. 1, 2A and 2B. In other implementations (which may, for example, be used on keyboards not having a keyboard lattice), the bosses may be integral with, or attached to, the underside of the support plate 30.

The bosses may project only a small distance above the support plate (e.g. less than the screw nut) and thus not interfere with the electronic device components. However, if there is any risk of interference then bosses which are not used to secure a screw nut may be removed or cut off. Furthermore, if the bosses are heat stakes than they may melt during the heat bonding process and so any stakes to which a screw nut is not attached may effectively disappear (e.g. by filling a recess or reducing to the level of the support board) during the heat bonding process. The screw nut may be attached to the boss, or bosses, by any one of various methods. According to one example, the screw nut plate portion is attached by heat bonding, for instance as shown in FIG. 2B. Heat bonding is very convenient as it may easily be performed by the OEM during the manufacturing process without particular specialized equipment. Further, if the OEM uses a process whereby the keyboard lattice is heat bonded to the support plate, then attachment of the screw nuts to the bosses by heat bonding may easily be integrated into the same manufacturing step.

However, other methods of attaching the screw nut to the support plate are possible, including adhesion, securing with small screws etc.

Figure 5:
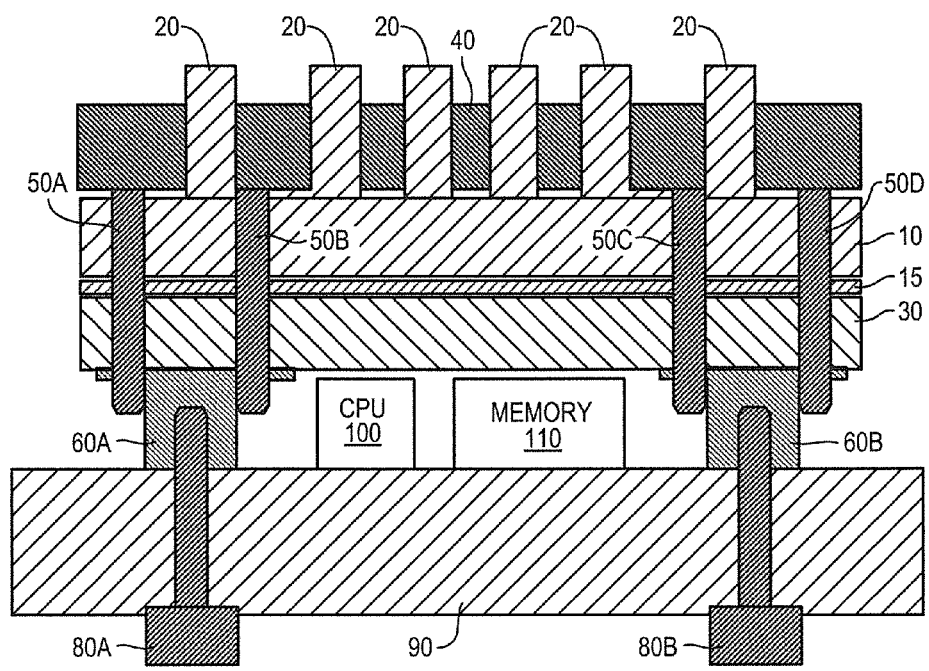
FIG. 5 shows a schematic example of a keyboard attached to a portable electronic device.

FIG. 5 is a cross section along the lines A-A of FIG. 3. It shows a portion of the keyboard and the portable electronic device to which it is mounted. The keyboard module 10 having a plurality of keys 20 is attached to and supported by the support plate 30. A keyboard lattice 40 is placed over a first (upper) side of the keyboard module and support plate. The lattice 40 fits around the keys 20 and has certain projections 50A-50D which extend through holes in the keyboard module and support plate and form bosses for attachment to a screw nut.

The keyboard may have a light guide for illuminating the keyboard surface. Typically the light guide receives light from one or more LEDs or other light sources and directs it through gaps between the keys or translucent parts of the keys to give a pleasant illuminated effect. An example light guide 15 is shown in FIG. 5, where it is provided as a sheet which fits between the keyboard module 10 and support plate 30. The projecting portions 50A-50D of the lattice should be located in areas which will not affect operation of the light guide.

A first screw nut 60A and a second screw nut 60B are attached to the support plate 30 by heat bonding to bosses 50A, 50B and 50C, 50D respectively. The keyboard is secured to a frame or main body 90 of the portable electronic device by screw 80A and 80B which screw into threaded apertures of screw nuts 60A and 60B respectively. It is to be noted that the position of the screw nuts 60A and 60B needs to be selected carefully to ensure that the screw nut does not interfere with the internal components of the portable electronic device such as CPU 100 and memory chips 110. As these components are typically hardwired into a PCB or motherboard of the portable electronic device it is not possible to move them. It is to be understood that FIG. 5 is illustrative only, while it only shows only a few keys above the space taken up by the CPU and memory chips, in practice there would likely be more keys. However, it illustrates how the location of the screw nuts is chosen not to interfere with the internal components of the portable electronic device.

Referring back to FIGS. 3 and 4, they show a number of holes 32 in the support plate 30. These may receive heat stakes or projections of the keyboard lattice for attachment (e.g. by heat bonding) to the support plate 30. However, for clarity only the heat stakes used as potential sites for screw nut attachment are shown in FIGS. 3-5. Heat stakes used only for attachment of the keyboard lattice to the support plate 30 are not shown in FIGS. 3-5 and the holes 32 are not shown in FIG. 5. It is envisaged that heat stakes for potential attachment to a screw nut may be slightly longer and/or thicker than heat stakes used only for attachment to the support plate.

FIG. 6 is a flow diagram of an example method of assembling a keyboard according to the present disclosure. The method may be carried out by a manufacturer which assembles portable electronic devices having keyboards (e.g. the computing devices such as a laptop computers etc).

At 200 a keyboard module and support plate having a plurality of bosses for possible attachment to a screw nut is provided.

In one implementation (shown by 210) the bosses are provided by fitting a keyboard frame (such as, but not necessarily, a lattice) over a keyboard module. The keyboard frame has projections which extend through holes in the keyboard module and support plate to form bosses to which a screw nut may be attached.

In other implementations the frame, keyboard module and support plate may already be assembled before they are received by the device manufacturer. In some implementations there may be no separate keyboard frame in which case the bosses are not projections of the keyboard frame, but may instead, for example, be attached to, or integral with, the support plate 30.

At 220 some of the bosses are selected for attachment to a screw nut. The bosses may be selected such that the position of a screw nut will not interfere with any components of the portable electronic device which the keyboard is to be attached to.

At 230 the selected bosses are attached to a screw nut. Several screw nuts may be attached to the selected bosses (e.g. plural groups each comprising one or more bosses and a screw nut attached to each group). The attachment may, for example, be by heat bonding. After the attachment is complete the remaining bosses to which a screw nut is not attached may be removed if necessary.

Screws may then be used to attach each screw nut to a main body, or frame, or other part of a portable electronic device, thereby securing the keyboard to the portable electronic device.

The keyboard module and support plate are typically provided by the same company ('the keyboard module supplier'). However, the company which assembles the portable electronic device (e.g. an OEM or Original Equipment Manufacturer) is often a different company. If there is a keyboard lattice, it may be provided by the 'keyboard module supplier' or may be provided separately by another independent company. In some cases the OEM will be provided with the keyboard lattice and keyboard modules already assembled; in other cases the OEM may assemble the keyboard lattice and keyboard modules themselves. However, in both cases, heat bonding of the keyboard lattice to the keyboard module is typically carried out by the OEM. This makes it easy for the OEM to integrate heat bonding of the screw nut to the keyboard support plate and heat bonding of the keyboard lattice to the keyboard module into the same process.

For example, the keyboard lattice 40 may have a first set of projections (shown for instance as bosses 50 in FIGS. 3-5) for attachment to a screw nut, and a second set of projections (not shown in the drawings, but which would extend through the holes 32 in FIGS. 3 and 4) to secure the lattice to the keyboard module. The first set of projections may be longer and/or thicker than the second set of projections. According to one example, the first set of projections are heat bonded to the screw nut plate portion at the same time as the second set of projections are heated bonded to the keyboard module and support plate.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A keyboard comprising:
    a support plate;
    a keyboard module comprising a plurality of keys on a first side of the support plate;
    a screw nut including a plate portion and a main body with a threaded aperture;
wherein the plate portion of the screw nut is attached to a second side of the support plate by heat bonding; and
    a keyboard frame fitting around the keyboard module and having a plurality of projections which extend through holes in the support plate, the plate portion of the screw nut being attached to a projection of the keyboard frame.

2. The keyboard of claim 1, wherein the plate portion of the screw nut is heat bonded to the projection of the keyboard frame.

3. The keyboard of claim 1 wherein the keyboard frame is a lattice which fits in gaps between individual keys of the keyboard module.

4. The keyboard of claim 1 wherein the plate portion of the screw nut is heat bonded to a group of projections of the keyboard frame.

5. The keyboard of claim 1, further comprising:
    a plurality of screw nuts, each of the plurality of screw nuts having a plate portion and a main body with a threaded aperture, wherein each of the plurality of screw nuts is attached to a respective group of projections of the keyboard frame by heat bonding of the plate portion to the respective group of projections.

6. The keyboard of claim 5, wherein there are a larger number of the plurality of projections than the number of the plurality of screw nuts.

7. The keyboard of claim 1, wherein the keyboard frame is plastic and the projections are heat stake pins.

8. A portable electronic device having a keyboard according to claim 1 and a main body; the keyboard being attached to the main body by a screw and the screw nut; the screw being received in the threaded aperture of the screw nut.

9. A keyboard comprising:
    a keyboard module comprising a plurality of keys;
    a support plate attached to the keyboard module; and
    a plurality of bosses extending from the support plate, wherein at least one of said bosses has a screw nut attached thereto and at least one of said bosses does not have a screw nut attached thereto, and wherein the plurality of bosses are formed by heat stake pins projecting from a keyboard frame which fits over the keyboard module, the heat stake pins extending through holes in the support plate.

10. The keyboard of claim 9 wherein said plurality of bosses comprise at least a first group of bosses to which a screw nut plate is attached and a second group of bosses to which a screw nut plate is not attached.

11. The keyboard of claim 9 wherein the screw nut is attached to a boss by heat bonding.

12. The keyboard of claim 9, wherein the plurality of bosses are formed of plastic and the screw nut is formed of metal.

13. The keyboard of claim 9 wherein a light guide is disposed between the support plate and the keyboard module.

14. A method of assembling a keyboard comprising:
    providing a keyboard module attached to a support plate;
    providing multiple groups of bosses projecting from the support plate by placing a keyboard lattice over the keyboard module and causing projections of the keyboard lattice to extend through holes in the support plate to form multiple groups of bosses;
    selecting a group of bosses from the multiple groups of bosses; and
    attaching a screw nut to the selected group of bosses.

15. The method of claim 14 wherein each group of bosses comprises a plurality of bosses.

16. The method of claim 14, wherein at least one of the groups of bosses is not attached to a screw nut.

17. The method of claim 14, wherein attaching the screw nut further comprises attaching the screw nut to the selected group of bosses by heat bonding.

18. The method of claim 14 comprising using a screw to attach the screw nut to a portable electronic device.

* * * * *